United States Patent [19]

Landoni et al.

[11] Patent Number: 4,981,945
[45] Date of Patent: Jan. 1, 1991

[54] LINEAR, PHOSPHORUS-CONTAINING COPOLYESTER, PROCESS FOR ITS PREPARATION AND ITS USE AS A FLAME RETARDANT AGENT

[75] Inventors: Gianluigi Landoni; Carlo Neri, both of Milan, Italy

[73] Assignee: Enichem Synthesis, S.p.A., Palermo, Italy

[21] Appl. No.: 324,907

[22] Filed: Mar. 17, 1989

[30] Foreign Application Priority Data

Mar. 23, 1988 [IT] Italy ................. 19904A/88

[51] Int. Cl.$^5$ ............................ C08G 63/02
[52] U.S. Cl. ..................... 528/272; 528/286; 528/287; 528/302; 528/305; 528/308; 528/308.1; 528/308.6; 525/439; 525/444; 524/123; 524/126; 524/706; 524/710; 106/18.14; 106/18.18
[58] Field of Search ............ 528/272, 286, 287, 302, 528/305, 308, 308.1, 308.6; 525/439, 444; 524/123, 126, 706, 710; 106/18.14, 18.18

[56] References Cited

U.S. PATENT DOCUMENTS 4,087,403  5/1978  Moedritzer .
4,517,355  5/1985  Mercati et al. ................. 528/287
4,812,502  3/1989  Cipriani et al. ................. 524/125

Primary Examiner—John Kight, III
Assistant Examiner—Sam A. Acquah
Attorney, Agent, or Firm—Hedman, Gibson, Costigan & Hoare

[57] ABSTRACT

A linear copolyester, useful as a flame retardant agent, contains in its macromolecule units derived from:

(a) terephthalic acid;

(b) ($C_2$–$C_6$)-alkylene glycol;

(c) phenyl-hydroxymethylene phosphinic acid, in a mutual ratio comprised within the range of from 1:1:0.2 to 1:1:1, and is obtained by placing a linear polyester derived from terephthalic acid and a ($C_2$–$C_6$)-alkylene glycol into contact with a poly(phenylhydroxymethylene phosphinate) (I):

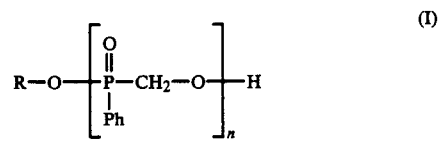

wherein:

Ph is the phenyl radical;

R is a hydrogen atom or a linear or branched alkyl radical containing from 1 to 8 carbon atoms; and D is from 2.5 to 100, under melting conditions, and for a contact time not longer than about 30 minutes.

Such a copolyester contains the (c) units randomly distributed throughout the macromolecular chain, has an amorphous or partially crystalline structure as a function of its content of said (c) unit, and is useful in order to endow the linear polyesters, also in mixture with one another (polymeric alloys), with flameproof characteristics.

1 Claim, No Drawings

LINEAR, PHOSPHORUS-CONTAINING COPOLYESTER, PROCESS FOR ITS PREPARATION AND ITS USE AS A FLAME RETARDANT AGENT

The present invention relates to a linear, phosphorus-containing copolyester, to the process for preparing it and to its use as a flame retardant agent.

In the art, linear polyesters are known, which are obtained by polycondensing, in the presence of suitable catalysts, terephthalic acid, or its dimethyl ester, with an alkylene glycol, in particular ethylene glycol. The so obtained linear polyesters are valuable products, in that they constitute the raw material for such articles of manufacture as fibres, films, and still other articles widely used in the commercial field.

A drawback which affects such articles is their flammability, with all the consequent risks, in particular in the textile sector and in the electronic sector.

Therefore, for linear polyesters various flame retardant agents, and in particular halogenated flame retardant agents, were proposed, to be applied by means of a surface treatment of the manufactured article, e.g., during the step of finishing of a textile material.

According to another technique known from the prior art, the flameproof characteristics are supplied by introducing monomeric, phosphorus containing units into the polymeric chain of the linear polyester.

So, e.g., U.S. Pat. No. 4,517,355 discloses a linear flameproof polyester constituted by the product of polycondensation of a dicarboxylic aromatic acid and an alkylene glycol, which polyester contains in its molecule units deriving from phenyl-hydroxymethylene phosphinic acid, or of an ester thereof, is used in order to endow the linear polyesters with flameproof characteristics.

According to as disclosed in this patent application, the oligomer can be added to a precondensate from a bicarboxylic aromatic acid and an alkylene glycol, or it can be added to the preformed linear polyester, by operating under melting conditions.

According to a particular form of practical embodiment disclosed in said patent application, a "master" is prepared by putting the oligomer and the linear polyester into contact with each other under melting conditions. Thanks to its high content of phosphorus, this master can be used as a flame retardant agent. In particular, according to Example 9 of said patent application, said master is prepared by operating at a temperature of 280° C., under high vacuum, for 2 hours.

However, it was observed that such an operating procedure is not totally satisfactory in that under the above reported conditions losses of phosphorus compound due to volatilization, as well as degradation phenomena may occur in the linear polyester submitted to the treatment, with the eventually obtained master consequently showing undesired characteristics.

The present Applicant found now that short times of contact of a linear polyester in the molten state and an oligomer of phenyl-hydroxymethylene phosphinic acid, or an ester thereof, unexpectedly cause said oligomer and said linear polyester to react with each other, with said reaction proceeding up to completeness, or substantial completeness The present Applicant found also said such a reaction causes the formation of a linear copolyester to take place in the absence, or substantial absence, of degradation phenomena, which linear copolyester is rich of units deriving from phenyl-hydroxymethylene phosphinic acid, with said units being randomly distributed between the units deriving from the bicarboxylic aromatic acid and the alkylene glycol.

The present Applicant found finally that such copolyesters can be obtained as amorphous or partially crystalline solid materials, as a function of the amount of units derived from phenyl-hydroxymethylene phosphinic acid introduced into the macromolecular chain of the linear polyester.

In accordance therewith, the present invention relates to a linear copolyester, useful as a flame retardant agent, which contains in its macromolecule units derived from:
(a) terephthalic acid;
(b) (C$_2$–C$_6$)-alkylene glycol; and
(c) phenyl-hydroxymethylene phosphinic acid, in a mutual ratio comprised within the range of from 1: 1:2 to 1:1:1, in which the (c) units are randomly distributed between the (a) and (b) units, obtained by bringing a linear polyester deriving from terephthalic acid and a (C$_2$–C$_6$)-alkylene glycol into contact with a poly(phenyl-hydroxymethylene phosphinate) (I):

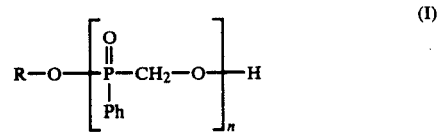

wherein:
Ph is the phenyl radical;
R is a hydrogen atom or a linear or branched alkyl radical containing from 1 to 8 carbon atoms; and
n is a number comprised within the range of from 2.5 to 100;
by operating under melting conditions, and for a time period not longer than about 30 minutes.

The linear polyesters useable in the preparation of the linear copolyester according to the present invention are the products of polycondensation of terephthalic acid with an alkylene glycol containing from 2 to 6 carbon atoms in their molecule, such as, e.g., ethylene glycol, 1,4-butanediol, neopentyl-glycol and 1.4-cyclohexanediol.

For the intended purpose a poly(ethylene terephthalate) is preferred, which typically has the following characteristics:
Viscosity index (V.I.)=0.65;
Content of COOH groups=about 17 meq/kg; and
Melting point=258° C.

The poly(phenyl-hydroxymethylene phosphinate) useful for the preparation of the linear copolyester according to the present invention can be obtained by means of the condensation of an alkyl ester of phenyl-hydroxymethylene phosphinic acid, by heating to a temperature comprised within the range of from 150° C. to 200° C., and progressively decreasing the pressure from the atmospheric value down to about 0.1–1 mm$_{Hg}$, within a time of from about 5 to 30 hours.

During the condensation, the aliphatic alcohol which develops as a reaction byproduct is eliminated. The reaction can be carried out in the presence of a transesterification catalyst, in particular tin, titanium and germanium compounds.

For the intended purpose, the isobutyl ester of phenyl-hydroxymethylene phosphinic acid is used, and the condensation is carried out at a temperature of the order of from 170° C. to 185° C., with the isobutyl alcohol obtained as a reaction byproduct being removed from the reaction mass.

Such an isobutyl ester of phenyl-hydroxymethylene phosphinic acid can be obtained by means of the reaction between formaldehyde and the isobutyl ester of phenylphosphinic acid.

This latter can be obtained in its turn by means of the reaction of isobutanol with benzene-phosphorus dichloride, as it will be disclosed in greater detail in the following experimental examples.

The poly(phenyl-hydroxymethylene phosphinate) obtained by means of the above indicated procedure is a glass-like solid soluble in the normal organic solvents (acetone, dichloroethane, and so forth).

For the purposes according to the present invention, a poly(phenyl-hydroxymethylene phosphinate) corresponding to formula (I) is preferred, in which R is isobutyl, and n has an (average) value comprised within the range of from 35 to 40. Such a poly(phenyl-hydroxymethylene phosphinate) shows a content of phosphorus (computed as elemental phosphorus) of the order of from 19.1 to 19.8% by weight, its softening point is of the order of 80° C., and its glass transition temperature $(T_g)$ is of the order of 48° C.

In the preparation of the linear copolyester according to the present invention, poly(phenyl-hydroxymethylene phosphinate) and the linear polyester are brought into contact with each other and are homogenized, by operating under melting conditions and for a time interval not longer than about 30 minutes. The ratio of the poly(phenyl-hydroxymethylene phosphinate) to the linear polyester will depend on the amount of monomeric phosphorus-containing units which one wants to introduce into the linear polyester, on considering the above reported ranges and the completeness, or substantial completeness of the reaction.

The reaction temperature will depend on the preselected linear polyester and will be generally comprised within the range of values of from 230° C. to 290° C. In case of the poly(ethylene terephthalate) having the above reported typical characteristics, the reaction temperatures will preferably be of the order of from 270° C. to 280° C. The reaction is advantageously carried out in an anhydrous environment, under nitrogen or another inert gas. Advantageously, the reaction is carried out under a low vacuum, e.g., of the order of from 200 to 300 mm$_{Hg}$, in order to remove any volatile substances, either possibly present, or which may develop during the course of the reaction. As hereinabove stated, the reaction times are short. These reaction times do not exceed about 30 minutes, and preferably do not exceed about 20 minutes. The shortest reaction time is generally that time which is required in order to homogenize the molten reactants, and the greater the homogenizing efficiency, the shorter the reaction time. Optimum values were obtained with reaction times of the order of 10 minutes.

The so obtained linear copolyester can be discharged from the reactor as a rod, which is cooled, solidified and chopped into granules, for better handling characteristics when used as a flame retardand agent.

The linear copolyesters according to the present invention contain in their molecule units derived from:
(a) terephthalic acid;
(b) alkylene glycol; and
(c) phenyl-hydroxymethylene phosphinic acid, in a mutual ratio comprised within the range of from 1 1:0.2 to 1:1:1, in which the (c) units are randomly distributed between the (a) and (b) units.

These copolyesters may show a structure ranging from an amorphous to a partially crystalline structure, as a function of the percentage of said (c) units contained in their macromolecule.

So, in case of copolyesters obtained from:
(a) terephthalic acid;
(b) ethylene glycol; and
(c) phenyl-hydroxymethylene phosphinic acid, when their content of phosphorus (expressed as elemental phosphorus) is higher than about 5% by weight, solid, amorphous and transparent products are obtained, which have a low softening point. When this phosphorus content is lower than about 5% by weight, partially crystalline products are obtained, the melting point of which increases with decreasing phosphorus content.

The linear copolyesters according to the present invention are useful as flame retardant agents, capable of endowing the linear polyesters with flameproof characteristics, even when said linear polyesters are in mixture with one another (polymeric alloys).

In particular, the flameproof characteristics are conferred by simply melting and homogenizing the linear copolyester, and the linear polyester, or mixture of linear polyesters, with one another.

This operation can be suitably carried out in the melt-processing of the linear polyesters, in the processes of their transformation into such manufactured articles as fibres, films, moulded articles, and so forth.

The following experimental examples are illustrative of the purview of the present invention without limiting it.

EXAMPLE 1

(A) Preparation of the isobutyl ester of phenyl-phosphinic acid

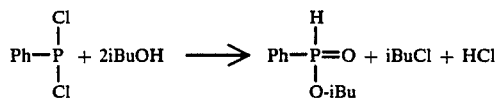

(Ph = phenyl; iBu = iso-butyl)

To a reactor of 1.5 l of capacity, equipped with a double wall for the forced circulation of the heat-exchange fluid, mechanical anchor stirring mean, dripping funnel of 500 ml of capacity with compensator, nitrogen inlet and outlet means, 422 g (5.69 mol) of anhydrous isobutanol and 1,000 ml of toluene are charged.

The mixture is cooled to 0°-5° C. and to the cooled and stirred mixture, 497 g (2.77 mol) of benzene-phosphorus dichloride is gradually added. The introduction rate is so regulated, that the temperature of the mixture is always lower than 20° C. Furthermore, through the mixture nitrogen is bubbled, in order to remove the hydrochloric acid formed as a reaction byproduct, which is conveyed with the nitrogen stream out from the reactor, to a neutralization tower. At the end of the addition, the reaction mixture is kept stirred for 30 minutes at room temperature (about 20° C.). The distillation of the reaction mixture is then carried out, with this latter being rectified up to a maximum temperature inside the reactor of about 130° C. In this way, any residual hydrochloric acid is completely removed from the reaction mixture, and in the distillate isobutyl chloride, toluene and traces of isobutanol are recovered.

The residue inside the reactor is constituted by the isobutyl ester of phenyl-phosphinic acid and traces of toluene, as determined by means of gas-chromatographic analysis.

(B) Preparation of isobutyl ester of phenyl-hydroxymethylene-phosphinic acid

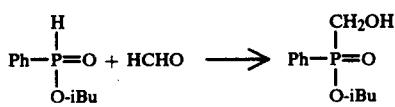

To the isobutyl ester of phenyl-phosphinic acid (545 g, 2.75 mol) obtained in the above (A) part, and heated, inside the same reactor, to a temperature of from 120° C. to 130° C., paraformaldehyde (85.5 g, 2.85 mol of formaldehyde) is added. The reaction is allowed to proceed at the indicated temperature, and with stirring, for about 30 minutes. During this time period, any traces of toluene are removed by evaporation, together with a small amount of isobutanol. This latter is presumably formed owing to limited phenomena of condensation of the reaction product, the isobutyl ester of phenylhydroxymethylene phosphinic acid. 626 g of reaction product is obtained (yield 99.8%).

(C) Condensation of the isobutyl ester of phenyl-hydroxymethylene phosphinic acid

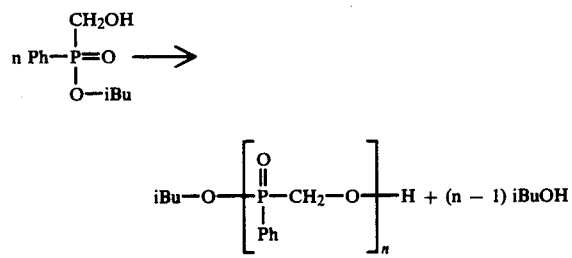

The condensation of the isobutyl ester of phenylhydroxymethylene phosphinic acid is carried out in the presence of 3.5 g of dibutyl-tin dilaurate as the catalyst, in the same reactor wherein the synthesis of this esther is carried out, with a heating fluid at the temperature of 175° C.-180° C. being circulated inside the external reactor jacket, and the pressure being progressively decreased from the atmospheric value down to about 0.1-1 mm$_{Hg}$, within a time of 13-14 hours. The isobutyl alcohol liberated is evaporated off and is collected externally to the reactor. The progressing of the reaction is shown by a marked shrinking of the reaction mass, and by its increase in viscosity and opacity. After cooling, 412 g is obtained of a solid product having a softening point of about 80° C. This product is a poly(phenylhydroxymethylene phosphinate), represented by the above reported formula, with an average value of 0 of about 40, and a phosphorus content (expressed as elemental phosphorus) of 19.4% by weight.

In the following application examples, this product is denominated in short form as the "oligomer".

EXAMPLE 2

To an autoclave of 1.5 l, equipped with a magnetic-driven stirrer of the scraping anchor type, thermocouple, double inlet for vacuum/nitrogen, condenser for condensing the vapours and, at its bottom, with valve means for discharging the molten mass, 485.3 g of poly(ethylene terephthalate) as dried granules of fibre grade (viscosity index V.I. 0.655; melting point 258° C.) and 414.7 g of the oligomer prepared according to as disclosed in Example 1, part (C), as granules, are charged. The system under an overpressure of dry nitrogen is put under vacuum for about 20 minutes, then three successive treatments of washing with dry nitrogen are carried out, with vacuum being applied between them. Finally, the nitrogen blanketing atmosphere is restored, and inside the jacket of the autoclave diathermic oil at 290° C. is circulated. When the temperature inside the interior of the autoclave reaches the value of 277° C., the mass is stirred at 20 revolutions per minute, and the pressure is decreased down to 250 mm$_{Hg}$. After keeping the system for 10 minutes under these conditions, cold oil is circulated inside the jacket of the autoclave until the temperature inside the interior of the autoclave decreases down to 150° C. Inside the reactor an overpressure of about 100-150 mm$_{Hg}$ is then applied, the bottom valve of the reactor is then opened, and the reaction product is discharged as a transparent rod which, after cooling and solidification, is chopped to yield granules.

A flameproof copolyester is obtained with a substantially quantitative yield, as granules having the characteristics as reported in Table 1.

EXAMPLE 3

The procedure of Example 2 is followed, with 621.7 g of poly(ethylene terephthalate) and 278.3 g of oligomer being charged to the autoclave. The reaction is carried out for about 10 minutes at 280° C. The reaction product is discharged from the autoclave at about 190-200° C.

A flameproof linear copolyester is obtained with a substantially quantitative yield, as granules having the characteristics as reported in Table 1.

EXAMPLE 4

The procedure of Example 2 is followed, with 673.6 g of poly(ethylene terephthalate) and 226.4 g of oligomer being charged to the autoclave. The reaction is carried out for about 10 minutes at 280° C. and the reaction product is discharged at about 235° C.

A flameproof linear copolyester is obtained with a substantially quantitative yield, as granules having the characteristics as reported in Table 1.

EXAMPLE 5

The procedure of Example 2 is followed, with 714.4 g of poly(ethylene terephthalate) and 185.6 g of oligomer being charged to the autoclave. The reaction is carried out for about 10 minutes at 280° C. and the reaction product is discharged at about 245° C.

A flameproof linear copolyester is obtained with a substantially quantitative yield, as granules having the characteristics as reported in Table 1.

EXAMPLE 6

The procedure of Example 2 is followed, with 767.8 g of poly(ethylene terephthalate) and 132.2 g of oligomer being charged to the autoclave. The reaction is carried out for about 10 minutes at 280° C. and the reaction product is discharged at about 255° C.

A flameproof linear copolyester is obtained with a substantially quantitative yield, as granules having the characteristics as reported in Table 1.

In this Table the corresponding characteristics of the poly(ethylene terephthalate) (PET) used for preparing the flameproof copolyesters are reported as well.

TABLE 1

| Flameproof Copolyester | p (% by weight) | Melting ΔH (J/g) | Melting peak temp. (°C.) | Bending temperat. (°C.) |
|---|---|---|---|---|
| Example 2 | 8.94 | — | — | ND* |
| Example 3 | 6.04 | — | — | 120 |
| Example 4 | 4.88 | 21.5 | 223 | 150 |
| Example 5 | 3.98 | 39.3 | 231.5 | 180 |
| Example 6 | 2.90 | 67.3 | 231.6 | ND* |
| PET | — | 50.7 | 257.0 | >250 |

*ND = Not determined

In Table 1, the value of the melting ΔH of the flameproof copolyesters, expressed as J/g, is determined by differential scanning calorimetry (DSC), by operating on a METTLER instrument Model DSC 30, under a nitrogen atmosphere, with a temperature change speed of 10° C./minute, within the temperature range of from 35° C. to 300° C.

The melting peak temperature of such copolyesters, expressed as degrees Celsius, is still determined by DSC, under the above stated conditions.

The bending temperature of the copolyesters according to the present invention, expressed as degrees Celsius, is determined by using the METTLER equipment for thermomechanical analysis Model TMA 40. Such a temperature is the temperature of collapse of the detection of the linear heat expansion as measured with a calibrated sensor which applies a force of 0.1 $N_w$ on a specimen of 3 mm of thickness, with flat parallel faces. The copolyesters of the Examples from 2 to 6 are linear terpolymers containing units derived from terephthalic acid, ethylene glycol and phenyl-hydroxymethylene phosphinic acid in the following proportions:

Example 2 1:1:1
Example 3 1:1:0.536
Example 4 1:1:0.400
Example 5 1:1:0.308
Example 6 1:1:0.210

By means of $^{31}$P-NMR and $^{13}$C-NMR analyses, it was determined that the units deriving from phenyl-hydroxymethylene hydroxymethylene phosphinic acid are in any case randomly distributed throughout the macromolecular chain.

Furthermore, the linear copolyesters containing a concentration of phosphorus higher than about 5% by weight are solid, amorphous and transparent products having a low softening point, difficult to be determined even by resorting to the bending temperature as measured by means of thermomechanical analysis. On the contrary, the copolyesters containing a phosphorus concentration lower than 5% by weight are characterized by a certain degree of crystallinity, as demonstrated by the value of the ΔH of melting obtained by DSC. The melting peak which can be determined in such copolyesters is a function of phosphorus concentration, and enthalpy is maximum for a phosphorus content of the order of 3% by weight. These copolyesters are soluble in such organic solvents as dioxane, chloroform, diglyme and dimethylsulfoxide.

EXAMPLE 7

Granules of the same poly(ethylene-terephthalate) (PET) as used in the above Examples from 2 to 6 (1,000 g) and granules of the flameproof copolyester of Example 6 (260 g) are blended and molten at a temperature of 285° C., with stirring and under a nitrogen atmosphere. These conditions are maintained for 15 minutes and then the mass is cooled. A flameproof poly(ethylene terephthalate) is thus obtained, with a phosphorus content (expressed as elemental phosphorus) of 0.6% by weight. Such a flameproof poly(ethylene terephthalate) results to be constituted by units derived from terephthalic acid, ethylene glycol and phenyl-hydroxymethylene phosphinic acid in the mutual ratio of 1:1:0.038. The $^{31}$P—NMR and $^{13}$C—NMR analyses demonstrate that the units derived from phenyl-hydroxymethylene phosphinic acid are randomly distributed throughout the macromolecular chains.

Furthermore, such a flameproof poly(ethylene terephthalate) shows a melting ΔH of 66.3 J/g and a melting peak temperature of 248° C.

EXAMPLE 8

To the same autoclave of 1.5 l as of example 2, 586 g of granules of poLy(butylene terephthalate) (commercial product "Pibiter" N.100 by MONTEDISON) and 314 g of the oligomer prepared according to Example 1, (C), are charged.

After three nitrogen/vacuum treatments, the content of the reactor is heated under nitrogen up to 260° C., by heating with diathermic oil at 280° C. The molten mass is stirred at 20 revolutions/minute, and nitrogen pressure is decreased down to 250 mm$_{Hg}$. After 10 minutes under these conditions, the internal temperature is lowered down to 240° C., an overpressure of 150 mm$_{Hg}$ is applied, and the molten reaction product is discharged through the reactor bottom valve, as a rod which is cooled, solidified, and chopped into granules.

A linear copolyester is thus obtained which, at the elemental analysis, shows to contain a concentration of 6.65% by weight of phosphorus (as elemental phosphorus) and a mutual ratio of the units deriving from terephthalic acid, 1,4-butane-diol and phenyl-hydroxymethylene phosphinic acid of the order of 1:1: 0.71.

The DSC analysis, carried out under nitrogen, with a temperature increase rate of 10° C./minute, shows a melting peak of 216° C. and a melting ΔH of 41.5 J/g. The poly(butylene terephthalate) used as the starting product shows its melting peak temperature at 230.4° C. and a melting ΔH of 49 J/g. The NMR analysis of the linear copolyester shows a random distribution of phosphorus-containing units throughout its macromolecular chain.

EXAMPLE 9

The procedure is the same as of Example 8. To the autoclave, 697 g of poly(butylene terephthalate) (commercial product "Pibiter" N.100 by MONTEDISON) as granules and 203 g of the linear copolyester obtained in said Example 8 are charged. The contents of the autoclave are heated for 15 minutes at 280° C., and the reaction product is discharged in the molten state at 250° C. In this way, a flameproof poly(butylene terephthalate) is obtained, which contains 1.5% by weight of phosphorus (as elemental phosphorus). Said flameproof poly(butylene terephthalate) contains the units derived from terephthalic acid, 1,4-butane-diol and phenyl-hydroxymethylene phosphinic acid in a mutual ratio of the order of 1:1:0.115; has a melting ΔH of 59.15 J/g, and a melting peak temperature of 224.3° C.

We claim:

1. A process for preparing a linear copolyester useful as a flame retardent agent wherein the copolyester comprises units derived from:
   (a) a terephthalic acid;
   (b) a ($C_2$–$C_6$)-alkylene glycol; and
   (c) a phenyl-hydroxymethylene phosphinic acid, the process comprising contacting a linear polyester derived from the terephthalic acid and the ($C_2$–$C_6$)-alkylene glycol with a poly(phenyl-hydroxymethylene phosphinate) (I):

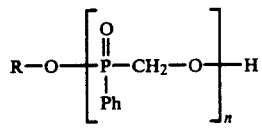

wherein:
Ph is the phenyl radical; R is a hydrogen atom or a linear or branched alkyl radical containing from 1 to 8 carbon atoms; and n is from 2.5 to 100, under melt conditions for a period not exceeding about 30 minutes.

* * * * *